(12) United States Patent
Nishizawa et al.

(10) Patent No.: US 6,942,481 B2
(45) Date of Patent: Sep. 13, 2005

(54) DISK PRODUCTION APPARATUS AND DISK PRODUCED BY DISK PRODUCTION APPARATUS

(75) Inventors: Akira Nishizawa, Yokohama (JP); Takayuki Onizawa, Yokosuka (JP); Shinji Ohta, Kawasaki (JP)

(73) Assignee: Victor Company of Japan, Ltd. (JP)

( * ) Notice: Subject to any disclaimer, the term of this patent is extended or adjusted under 35 U.S.C. 154(b) by 61 days.

(21) Appl. No.: 10/437,641

(22) Filed: May 14, 2003

(65) Prior Publication Data

US 2003/0215599 A1 Nov. 20, 2003

(30) Foreign Application Priority Data

May 14, 2002 (JP) .................................... 2002-138456

(51) Int. Cl.[7] ............................................. B29C 45/36
(52) U.S. Cl. ..................................... 425/542; 425/400
(58) Field of Search ................................. 425/400, 422, 425/542, 810

(56) References Cited

FOREIGN PATENT DOCUMENTS

| JP | 2001-334557 | 12/2001 | ............. B29C/45/36 |

OTHER PUBLICATIONS

Translation of Japanese patent document 2001–334557.*

\* cited by examiner

*Primary Examiner*—Alexander S. Thomas
(74) *Attorney, Agent, or Firm*—Renner, Kenner, Greive, Bobak, Taylor & Weber

(57) ABSTRACT

A disk production apparatus has a movable-side metal mold and a fixed-side metal mold provided as facing the movable-side metal mold, the fixed-side metal mold having a center hole. Inserted into the center hole is a retainer to attach a stamper on the fixed-side metal mold. The center of an inner diameter of the retainer and the center of an outer diameter of the retainer are eccentric with each other. The retainer may be inserted into a center hole of the movable-side metal mold for attaching the stamper on the movable-side metal mold. A disk has a substrate having a center hole; a first zone formed on the substrate, data being recorded on the first zone; and a second zone formed on the substrate but outside the first zone. Labeled on the second zone is a marker indicating an amount of eccentricity applied to the retainer used in production of the disk by injection molding.

8 Claims, 6 Drawing Sheets

DISK PRODUCTION APPARATUS AND DISK PRODUCED BY DISK PRODUCTION APPARATUS

BACKGROUND OF THE INVENTION

The present invention relates to a disk production apparatus and a disk produced by the disk production apparatus. Particularly, this invention relates to a disk production apparatus achieving high concentricity (or low eccentricity) between the center hole of a molded transparent substrate and tracks on a data-recorded zone formed on the substrate and a disk on which the disk center hole and tracks on a data-recorded zone have high concentricity.

Optical disks have been widely used thanks to large storage capacity at high density and recordability and reproducibility without being contact with a recording/reproducing optical head.

There are several types of optical disk according to storage density depending on laser wave lengths for optical heads.

Compact disks (CD) are subjected to recording/reproduction with a track pitch of 1.6 μm and the minimum pit length of 0.9 μm at a wavelength of 780 nm for laser beams.

Digital versatile disks (DVD) are subjected to recording/reproduction with a track pitch of 0.74 μm and the minimum pit length of 0.4 μm at a wavelength of 635 nm for laser beams.

Optical disks for digital video recorders (DVR) are subjected to recording/reproduction with a track pitch of 0.32 μm and the minimum pit length of 0.16 μm at a wavelength of 400 nm for laser beams.

There are several types of recording format for optical-disk substrates (transparent resin substrates) according to track pitches, pit lengths and modulation techniques.

Nevertheless, it is the same for these optical disks that data are recorded thereon in the form of spiral uneven configurations such as groves or pits.

These data groves or pits are formed in the process called mastering. Produced at the last stage of mastering is a disk-like stamper having spiral uneven configurations of data groves or pits formed on a metallic plate thereon.

The disk-like stamper is set on an optical-disk metal mold of an optical-disk production apparatus (injection molding machine). Molten resin is shot into the metal mold and then cooled to produce optical-disk substrates.

The stamper has a center hole through which it can be held in the metal mold according to the size of the metal mold. In detail, the center hole is punched through the center of a spiral of data grooves or pits. The outer edge of the stamper is cut away into, usually, a round shape to fit the mold outer shape, thus the disk-like stamper being produced.

The disk-like stamper is then set in an optical-disk molding metal mold. The metal mold is then attached on the injection molding machine. Molten plastic material such as polycarbonate resin is shot into the metal mold and then cooled, thus an optical-disk substrate being produced. A center hole is punched through the optical-disk substrate with a center-hole punching tool such as a punch and a die.

The produced optical-disk substrate has data groves or pits formed thereon that have been transferred from the stamper. Formed on the substrate surface having the data groves or pits is a recording layer having reflecting and recording functions. Laminated on the recording layer are a protective layer, a dummy layer, a cover layer, etc., according to needs, thus an optical disk being produced.

Data is recorded on or reproduced from an optical disk while the disk is rotating about its center hole set at a center pin provided on a turn table of a recording/reproduction apparatus.

Recording/reproduction is performed while an optical head is tracking the data grooves or pits formed on the optical disk. Hence, the narrower the track pitch from CDs to DVDs and to DVRs, the higher the accuracy of tracking being required.

One requirement is thus the narrower the track pitch, the smaller the radial runout for the train of data grooves or pits per one rotation of an optical disk, which may otherwise cause inaccurate tracking of data grooves or pits.

Smaller radial runout is achieved with smaller mismatch (disk eccentricity) between the center of spiral data grooves or pits and the center hole of an optical disk.

Smaller disk eccentricity is achieved with higher accuracy of a punching technique for the stamper center hole and also higher accuracy of attaching the stamper on an injection molding machine.

It is, however, practically difficult to punch the stamper center hole so that it can meet the center of spiral data groove (pit) train on the stamper, resulting in low concentricity therebetween.

Production of a large number of stampers could offer several stampers of high concentricity (or low eccentricity), which inevitably driving up production costs.

High concentricity could be achieved with high accuracy of a stamper-attaching tool such as a stamper-inner-hole damper (or retainer). The retainer is inserted into the center hole of a stamper. It is further inserted into a particular section of a metal mold to lower the disk eccentricity.

This provides a small gap between the center hole of the stamper and the outer edge of the retainer, to enhance mechanical accuracy in attaching the stamper on the metal mold.

In addition, a bushing attached in the metal mold is inserted into an inner hole of the retainer so that the retainer can be attached into the metal mold. The gap between the inner hole of the retainer and the outer edge of the bushing is also made small.

This technique offers high concentricity at first, however, lowers the concentricity gradually as the retainer is worn. Abrasion can be checked by a particular instrument. The introduction of such instrument in optical-disk production however drives up production costs.

The center holes of stampers could be different in diameter from one another due to low accuracy of a stamper-hole punching machine, aging of the machine, inappropriate temperatures at production, etc. This requires a large number of retainers of outer diameters slightly different from one another, which leads to complicated parts managements and high costs.

SUMMARY OF THE INVENTION

In view of these problems, a purpose of the present invention is to provide a disk production apparatus that achieves low eccentricity between the center hole of a disk substrate produced by injection molding and the center of a data-recorded zone formed thereon, which compensates for eccentricity between the center hole of a stamper and the center of spiral data grooves or pits on the stamper and/or difference in diameter of the center holes of stampers, and also provides a disk exhibiting low eccentricity.

The present invention provides a disk production apparatus comprising: a movable-side metal mold; a fixed-side metal mold provided as facing the movable-side metal mold, the fixed-side metal mold having a center hole; and a retainer inserted into the center hole to attach a stamper on the fixed-side metal mold, a first center of an inner diameter of the retainer and a second center of an outer diameter of the retainer being eccentric with each other.

Moreover, the present invention provides a disk production apparatus comprising: a fixed-side metal mold; a movable-side metal mold provided as facing the fixed-side metal mold, the movable-side metal mold having a center hole; and a retainer inserted into the center hole to attach a stamper on the movable-side metal mold, a first center of an inner diameter of the retainer and a second center of an outer diameter of the retainer being eccentric with each other.

Furthermore, the present invention provides a disk comprising: a substrate having a center hole; a first zone formed on the substrate, data being recorded on the first zone; and a second zone formed on the substrate but outside the first zone, a maker being labeled on the second zone, the marker indicating an amount of eccentricity applied to a retainer used in production of the disk by injection molding, a first center of an inner diameter of the retainer and a second center of an outer diameter of the retainer being eccentric with each other by the amount of eccentricity indicated by the marker.

Still, furthermore, the present invention provides a retainer used in production of disks by injection molding comprising: a cylindrical outer surface; a cylindrical inner surface parallel to the outer surface; a guard section provided on the inner and outer surfaces, the guard section having a clamping surface for pressing a stamper under the guard section when the stamper is attached in a metal mold for injection molding, wherein a first center of a diameter of the inner surface and a second center of a diameter of the outer surface are eccentric with each other.

DETAILED DESCRIPTION OF EMBODIMENTS

Disclosed below are an optical-disk production apparatus and an optical disk as embodiments of disk production apparatus and disk, respectively, according to the present invention.

Described first briefly is an optical-disk production procedure.

A flat glass disk having photoresist applied thereon is set in a cutting machine. A laser beam modulated with data signals is radiated onto the glass disk while rotating to form sequential or intermittent grooves or intermittent pits (a data-recorded zone) corresponding to the data signals on the photoresist.

In detail, the grooves or pits are formed spirally around the center of the glass disk while the disk is rotating in the embodiment, although they could be formed in concentric circles. The present invention is of course applicable to such grooves or pits printed in concentric circles.

A metallic thin film is attached on the groove or pit train printed on the glass disk by nickel electroplating to make a duplicate of their shapes. Thus, the groove or pit train (data-recorded zone) formed as above is transferred onto a metallic plate (the metallic thin film) called a metal master, father or metal stamper.

A metallic plate having the data-recorded zone of uneven spiral data grooves or pits transferred from a resist-applied glass disk is called a stamper in this invention. The stamper is a mother to be set in a disk-production metal mold for production of optical disks.

The stamper is formed in a particular shape so that it can be accurately set in the disk-production metal mold.

Figure 1:
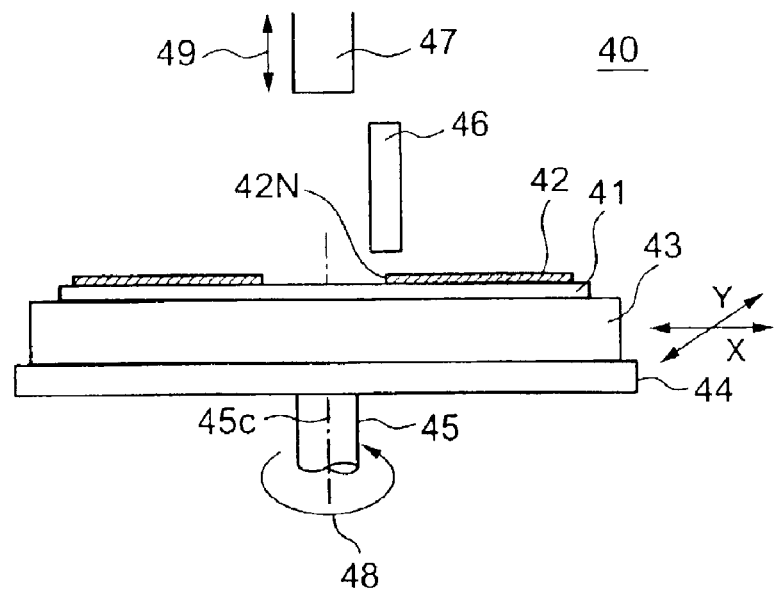
FIG. 1 a schematic illustration of a center-hole punching machine for punching a center hole through a stamper.

A center hole is punched through the stamper with a center-hole punching machine as illustrated in FIG. 1.

A center-hole punching machine 40 is equipped with a turn table 44 having an X-Y table 43 which can be shifted in the directions of X and Y axes. Provided over the X-Y table 43 is a microscope 46 to inspect a stamper 43 set on the X-Y table 43. The turn table 44 is rotatable about a rotary shaft 45, for example, in the direction of an arrow 48.

Also provided over the X-Y table 43 is a cylindrical punch 47 movable vertically. The center axis of the cylindrical punch 47 agrees with a center axis 45C of the rotary shaft 45 so that the punch 47 can move downwards to punch a circular center hole through the stamper 41.

Now, the stamper 41 having a data-recorded zone 42 of a groove or pit train formed thereon is set on the X-Y table 43, so that the data-recorded zone 42 faces the microscope 46.

Observed on the stamper 41 under the microscope 46 while the rotary table 44 is rotating is the border between the inner edge (track) of the inner-most section 42N of the data-recorded zone 42 and a mirror section on which no data-recorded zone has been formed, on the stamper 41.

The X-Y table 43 is adjusted to shift the stamper 41 so that change in the location of the border (or the inner-most section 42N) can be minimized by visual inspection under the microscope 46 during one rotation of the stamper 41 while the turn table 44 is rotating.

In other words, the center of the data-recorded zone 42 (track) agrees with the rotary center axis 45C of the turn table 44 at the minimum change in the location of the border during one rotation of the stamper 41 under the microscope 46.

The punch 47 is then descended vertically to punch a center hole through the center of the stamper 41 (the center of the data-recorded zone 42).

The outer edge of the stamper 41 having the center hole punched therethrough is processed into a shape to be fit in a particular position in a disk-molding metal mold.

Figure 2:
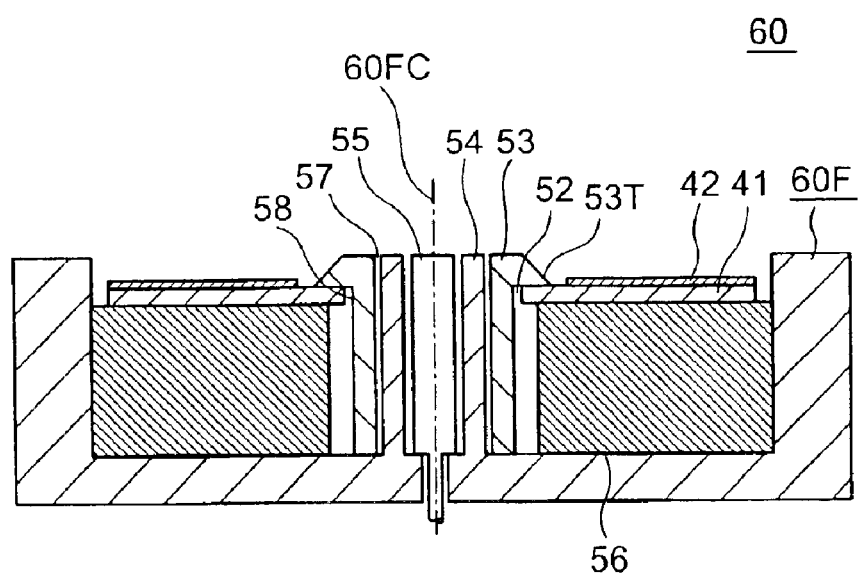
FIG. 2 is a schematic illustration of a metal mold for injection molding, in which a stamper is attached by means of a retainer.

The edge-processed stamper 41 is then set with the help of a retainer in an injection molding metal mold, as shown in FIG. 2.

A metal mold 60 for injection molding consists of a fixed-side metal mold 60F and a movable-side metal mold (not shown) provided over the metal mold 60F in an injection molding machine (not shown).

Provided at the center of the fixed-side metal mold 60F is a cylindrical punch 55 movable vertically. The punch 55 works with a die (not shown) provided in the movable-side metal mold (not shown) for punching a center hole through an injection-molded disk substrate.

Provided around the punch 55 is a cylindrical bushing 54 and a cylindrical retainer 53 inserted between the bushing 54 and the stamper 41.

The retainer 53 has a guard section 53T to press the inner edge of the stamper 41 so that the stamper 41 can be held on a stamper platform 56 as the data-recorded zone 42 of the stamper 41 lies upside in the fixed-side metal mold 60F.

In injection molding, molten resin is shot into the cavity between the fixed-side metal mold 60F and the movable-side metal mold (not shown). The molten resin is cooled down to solidify. A center hole is punched with the punch 55 and die (not shown), thus an optical-disk substrate being produced.

A reflective layer, a recording layer, a protective layer etc., are formed on the optical-disk substrate having the data-recorded zone, thus an optical disk being produced.

In this invention, the metal mold that is stationary against platen movements in an injection molding machine is called a fixed-side metal mold whereas that movable to follow the platen movements is called a movable-side metal mold.

Several parts or tools such as the stamper, punch and die may be provided in either of the fixed-side and movable-side metal molds in this invention.

The foregoing disclosure shows the stamper and punch provided in the fixed-side metal mold. Not only that, the stamper and punch or the stamper and die may be provided in the movable-side metal mold in this invention.

In other words, the present invention achieves high concentricity among the stamper, die and punch irrespective of which metal mold these tools are provided in.

Discussed next is how disks suffer from eccentricity.

The followings are four major causes of disk eccentricity, or disagreement between the center of data-recorded zone (center of the inner-most track) formed on an optical disk and the center of the center hole of the optical disk.

(1) Stamper Eccentricity

As disclosed with respect to FIG. 1, a center hole is provided at the center of the stamper 41, by the center-hole punching machine 40, so that the center hole can be concentric with the center of spiral groove or pit train (the data-recorded zone 42), for attaching the stamper 41 on a disk-molding metal mold.

Nevertheless, there is eccentricity between the data-recorded zone 42 and the center of the center hole in the range from 10 $\mu$m to 20 $\mu$m at maximum, due to disagreement between the rotary table 44 and the punch 47.

(2) Gap between Stamper Inner Section and Retainer Outer Section

The diameter of the center hole of the stamper 41 is larger than that of the outer section of the retainer 53 in the range from 3 $\mu$m to 5 $\mu$m so that the retainer 53 can be inserted into the center hole of the stamper 41 in the fixed-side metal mold 60F for injection molding, as shown in FIG. 2. This difference in diameter causes disk eccentricity of 5 $\mu$m at maximum.

(3) Gap between Retainer Inner Section and Bushing Outer Section

As disclosed with respect to FIG. 2, the retainer 53 is inserted into the center hole of the stamper 41 along the outer section of the bushing 54 provided at the center of the fixed-side metal mold 60F.

The diameter of the inner section of the retainer 53 is larger than the diameter of the outer section of the bushing 54 in the range from 3 $\mu$m to 5 $\mu$m. This difference in diameter also causes disk eccentricity of 5 $\mu$m at maximum.

(4) Deformation of Punch, Die and Bushing due to Setting Error between Two Facing Metal Molds As disclosed with respect to FIG. 2, a center hole is punched through a disk substrate that has been injection-molded and cooled to be solidified.

In detail, the center hole is punched through the disk substrate as the punch 55 inserted into the bushing 54 in the fixed-side metal mold 60F penetrates the die in the movable-side metal mold (both not shown). Or, it may be punched through the disk substrate as the punch 55 provided in the movable-side metal mold penetrates a die inserted into the bushing 54 in the fixed-side metal mold 60F.

A center hole is punched through a disk substrate as the punch 55 penetrates into the die (not shown). This is achieved when the punch 55 is concentric with the die in the fixed-side and movable-side metal molds in the injection molding machine.

It is, however, difficult to have high concentricity between the fixed-side and movable-side metal molds in the injection molding machine. In other words, they have eccentricity, practically, in the range from several 10 $\mu$m to 100 $\mu$m.

Accordingly, the punch 55 advances into the die with a huge pressure, so that the punch 55, die, bushing 54, etc., are deformed to become concentric with each other, to punch a center hole in the disk substrate. The bushing 54 and the punch 55 are bent and deformed in the longitudinal direction in FIG. 2, due to setting errors between the fixed-side and movable-side metal molds.

The concentricity of each tool or parts, such as, the punch 55, die and bushing 54 in each metal mold thus cannot avoid deformation of the tools or parts to be concentric with each other due to eccentricity between the facing two fixed-side and movable-side metal molds and hence between the tools or parts in the two metal molds.

Experiments on movements of the punch 55 and die from the initial locations due to eccentricity between the fixed-side and movable-side metal molds with several times of detachments of the molds while the stamper 41 is being attached revealed the movements in the range from 10 $\mu$m to 50 $\mu$m, which could cause maximum disk eccentricity.

The cause of such movements of the punch 55 and die is eccentricity between the two metal molds when they were attached again. In other words, the concentricity between the metal molds can be maintained unless they are detached. Replacements of the stamper 41 with no detachments of the metal molds also maintain the concentricity therebetween.

It is defined as "eccentric punch" when the punch 55 and die are eccentric with each other due to settings of the two metal molds even if the punch 55 and bushing 54 or the die and bushing 54 are concentric with each other in each metal mold.

There are two types of disk eccentricity which occur when the stamper 41 has been attached in either of the two metal molds. A first type is disk eccentricity which occurs in any direction when the stamper 41 is attached at the beginning but not vary in each disk molding. Another type is disk eccentricity which occurs and varies per disk molding.

The causes for the first type of disk eccentricity are (1) stamper eccentricity and (4) deformation of punch, die and bushing (called "eccentric punch" hereinafter) due to setting errors between two facing metal molds, discussed above.

Discussed below is disk eccentricity due to both of the causes (1) and (2).

Figure 3:
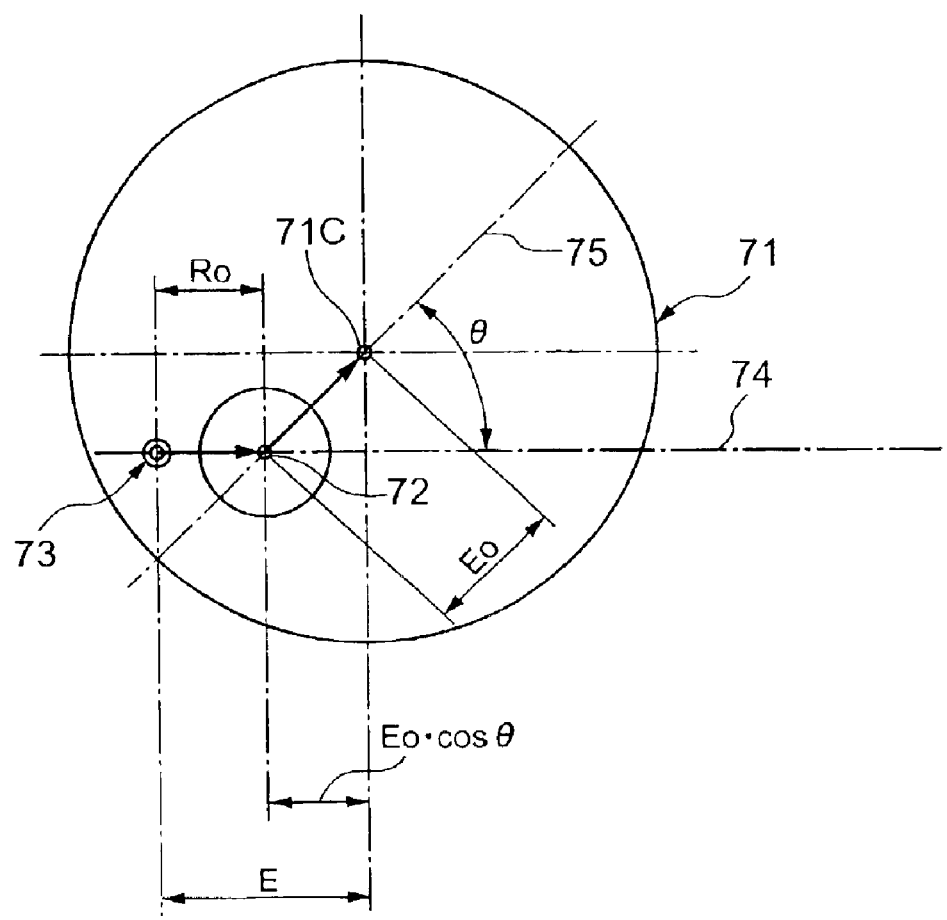
FIG. 3 is an illustration of the relationship between the center of an eccentric punch and that of a track formed on a disk when an eccentric stamper is held in the punch in a known metal mold for injection molding.

Illustrated in FIG. 3 is the relationship between the center of an eccentric punch and that of a track formed on a disk when an eccentric stamper is held in the eccentric punch in a known metal mold for injection molding.

As shown in FIG. 3, a center 71C of a track 71 formed of data grooves or pits (data-recorded zone) is apart (eccentric) from a center 72 of a stamper hole by a distance Eo, an amount of eccentricity due to the cause (1).

Also shown in FIG. 3 is that a center 73 of a punch, or the center of a center hole of a disk substrate is apart (eccentric) from the stamper hole center 72 by a distance Ro, an amount of eccentricity due to the cause (4). The amount of eccentricity (distance) Ro results from eccentricity or displacement of the punch center 73 from the initial location during disk molding.

It should be noted that the location of the punch in the metal mold and the location of the punch from the disk center hole do not meet each other.

The amount of eccentricity E observed on a center line 74 is given by $E = Ro + Eo \cdot \cos \theta$ where $\theta$ is the angle between the straight line (center line 74) connecting the punch center 73 and the stamper hole center 72, and another straight line 75 connecting the stamper-hole center 72 and the track center 71C, or at which the maximum track eccentric direction is oriented away from the center line 74 on which the maximum stamper-hole eccentric direction lies with respect to the punch center 73.

The equation above teaches that the amount of eccentricity E depends on at which angle the stamper is attached. The angle $\theta = 0°$ gives the maximum distance (amount of eccentricity) between the punch center 73 and the track center 71C.

In order to overcome eccentricity discussed above, the present invention employs an eccentric retainer for holding as tamper in a fixed-side (or a movable-side) metal mold.

Figure 4A:
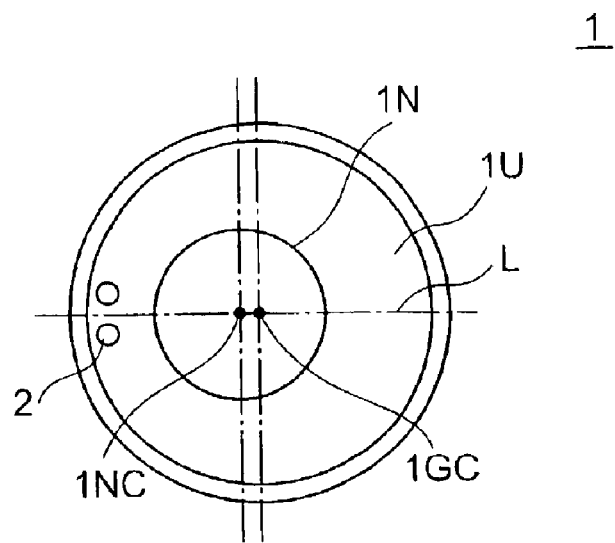
FIGS. 4A and 4B are a plan view and a sectional view, respectively, showing an embodiment of eccentric retainer used in a disk production apparatus according to the present invention.
Figure 4B:
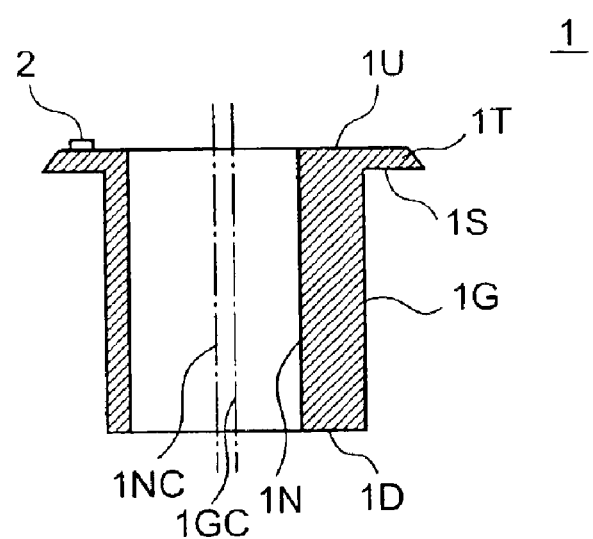

Shown in FIGS. 4A and 4B is an embodiment of eccentric retainer (stamper-holding member) used in a disk production apparatus according to the present invention. FIGS. 4A and 4B show the eccentric retainer in a plan view and a front sectional view, respectively.

As shown, an eccentric retainer (or a stamper-inner-hole clamper) 1 has a cylindrical outer surface 1G, a cylindrical inner surface 1N and a guard section 1T on the cylindrical surfaces. The guard section 1T is provided with a flat stamper-clamping surface 1S for pressing as tamper under the guard section 1T.

A center axis 1NC of the inner surface 1N and a center axis 1GC of the outer surface 1G are parallel to each other but eccentric with each other by a certain distance (a certain amount of eccentricity). The amount of eccentricity applied to the eccentric retainer 1 is indicated by markers 2 formed on a top surface 1U. As shown in FIG. 4A, the markers 2 are formed in the center axis 1NC's side, along a line L connecting the center axis 1GC of the outer surface 1G and the center axis 1NC of the inner surface 1N. It may, however, be formed in the center axis 1GC's side along the line L.

Disclosed next is a stamper according to the present invention.

Figure 5A:
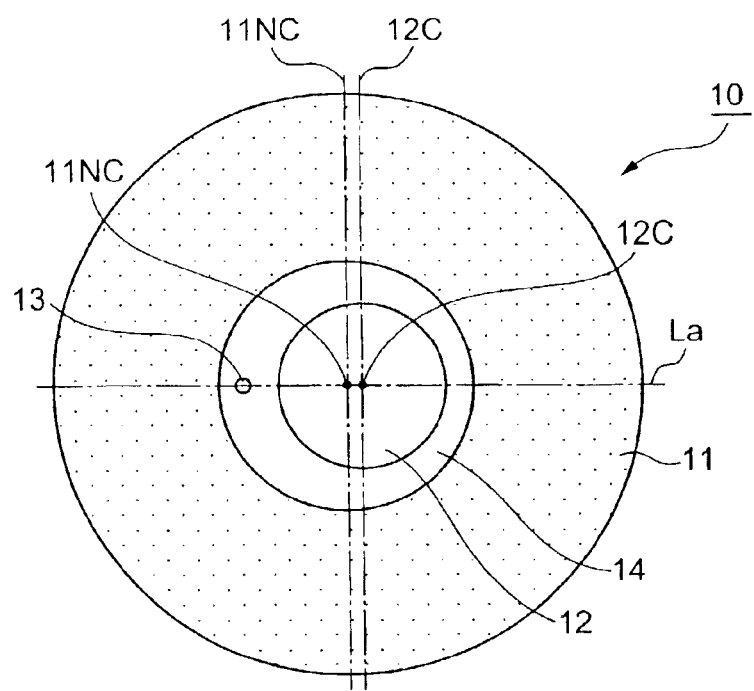
FIGS. 5A and 5B are a plan view and a sectional view, respectively, showing a stamper used in a disk production apparatus according to the present invention.
Figure 5B:
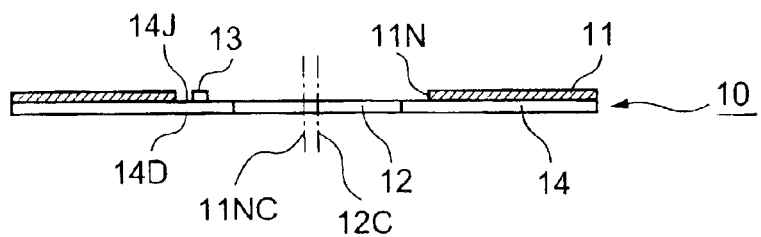

Shown in FIG. 5 is a stamper used in a disk production apparatus according to the present invention. FIGS. 5A and 5B show the stamper in a plan view and a front sectional view, respectively.

A stamper 10 has a nickel layer 14 with a data-recorded surface 14J formed thereon. Formed on the data-recorded surface 14J is a data-recorded zone 11 having a spiral train of grooves or pits (tracks). Provided at the center of the stamper 10 is a center hole 12 through which the stamper 10 is held in a metal mold.

Formed on the data-recorded surface 14 is a marker 13 indicating a distance (amount of eccentricity) between a center axis 11NC of an inner-most section (track) 11N on the data-recorded zone 11 and a center axis 12C of a center hole 12. The distance (amount of eccentricity) has been measured beforehand.

In detail, the marker 13 is formed in the center axis 11NC's side but on the location of no data-recorded zone being formed, on a line La connecting the center axis 11NC of the inner-most section 11N and the center axis 12C of the center hole 12.

A mark or numeral indicating data recorded on the data-recorded zone 11 may be labeled on a mirror section inside the data-recorded zone 11 on the stamper 10. Measured angle and amount of eccentricity between a particular position of this mark or numeral and the center axis 12C of the center hole 12 may be listed on a stamper-eccentricity inspection list, instead of the marker 13.

The stamper 10 (FIGS. 5A and 5B) can be held in a fixed-side metal mold by means of the eccentric retainer 1 (FIGS. 4A and 4B).

Figure 6A:
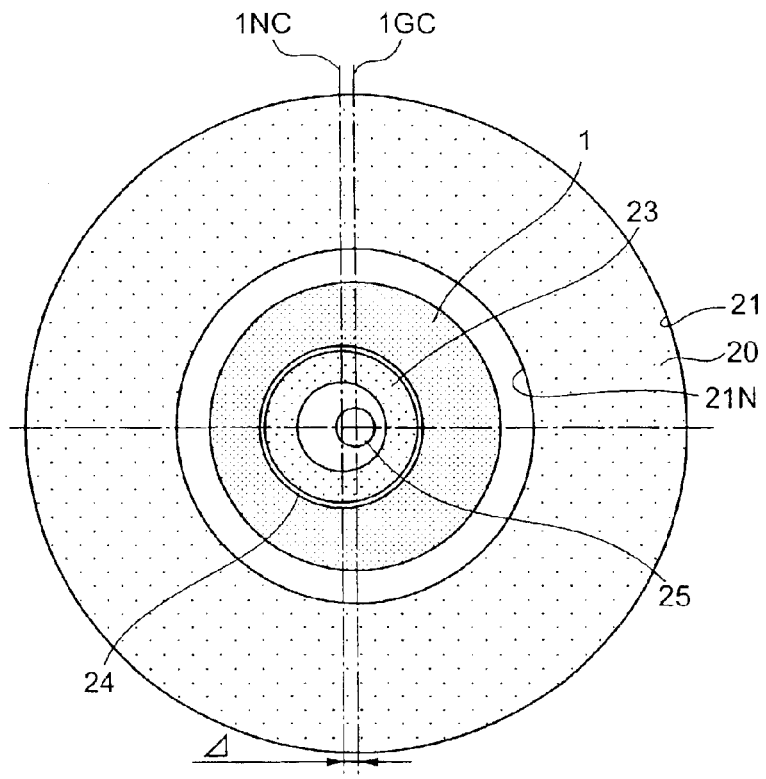
FIGS. 6A and 6B are a plan view and a sectional view, respectively, schematically illustrating a stamper held in a fixed-side metal mold for injection molding by means of the eccentric retainer shown in FIGS. 4A and 4B.
Figure 6B:
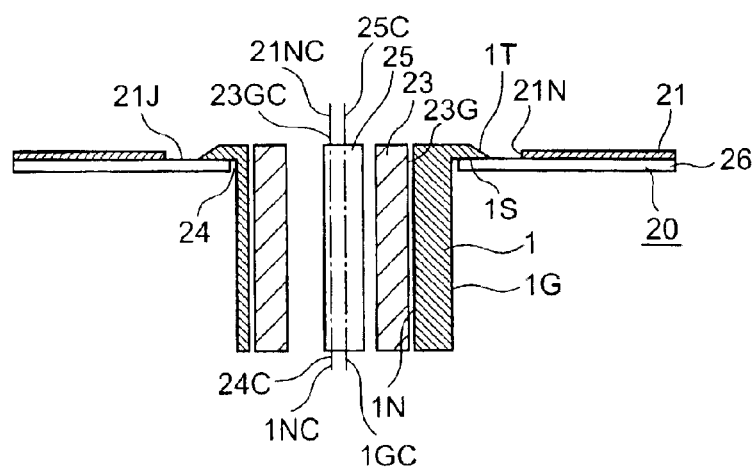

Illustrated in FIGS. 6A and 6B is a stamper held in a fixed-side metal mold of an injection molding machine by means of the eccentric retainer (FIGS. 4A and 4B) that is an embodiment according to the present invention. The metal mold and the injection molding machine are not shown for brevity.

A stamper 20 has a nickel layer 26 with a data-recorded zone 21 formed thereon.

The following disclosure is based two conditions (1) and (2) listed below, for brevity.

(1) A center axis 24C of a center hole 24 of the stamper 20 and a center axis 21NC of an inner-most section (track) 21N of the data-recorded zone 21 are parallel to each other and not eccentric with each other. And, (2) A center axis 25C of a punch 25 and a center axis 23GC of an outer section 23G of a bushing 23 are eccentric with each other. (There are two types of eccentricity in practical, eccentricity between a bushing and a punch as shown and also eccentricity between a punch and a die occurring only in disk molding due to eccentricity between a metal mold having the punch and another metal mold having the die.)

The condition (1) contradicts with the problems on stampers discussed in the background of the invention. Nevertheless, disclosing the embodiment in terms of both problems in the conditions (1) and (2) causes complexity of explanation and drawing figures. Therefore, the following disclosure is based on the assumptions that the stamper 20 has no eccentricity where as the punch 25 and the bushing 23 have eccentricity with each other.

As shown in FIGS. 6A and 6B, provided in the bushing 23 is the punch 25 for punching a center hole through an injection-molded optical disk.

The stamper 20 is held in a fixed-side metal mold (not shown) by means of the eccentric retainer 1 (FIGS. 4A and 4B) inserted into the center hole 24 of the stamper 20. The eccentric retainer 1 is inserted along the bushing 23 so that the stamper-clamping surface 1S of the guard section 1T presses an inner section of a data-recorded surface 21J of the stamper 20 on which the data-recorded zone is formed.

Under the condition (2), the center axis 25C of the cylindrical punch 25 and the center axis 23GC of the outer section 23G of the cylindrical bushing 23 are eccentric with each other by a distance Δ.

Contrary to this, the gap between the outer section 23G of the bushing 23 and the inner surface 1N of the eccentric retainer 1 is 5 μm or less. The gap between the outer surface 1G of the retainer 1 and the center hole 24 of the stamper 20 is also 5 μm or less. These small gaps provide smooth settings of the stamper 20 on the fixed-side metal mold, with the retainer 1 and the bushing 23.

The eccentric retainer 1 has eccentricity such that the center axis 1NC of the inner surface 1N and the center axis 1GC of the outer surface 1G are parallel to but eccentric with each other by a distance Δ.

The eccentric retainer 1 is inserted along the bushing 23 to cancel the eccentricity, the distance Δ between the punch 25 and the bushing 23. In detail, the retainer 1 is inserted along the bushing 23 so that the center axis 25C of the punch 25 and the center axis of the inner-most section 21N of the data-recorded zone 21 of the stamper 20 can be concentric with each other, thus the center of the center hole of an optical disk to be produced and the inner-most section of a data-recorded zone of the optical disk being concentric with each other.

In further detail, precise positioning is made to the eccentric retainer 1 in relation to the punch 25 to meet the following requirements:

(1) the plane including the center axes 1GC and 1NC of the outer and inner surfaces 1G and 1N, respectively, of the eccentric retainer 1 agrees with the plane including the center axis 25C of the punch 25 and the center axis 23GC of the outer surface 23G of the bushing 23;

(2) the center axis 25C of the punch 25 agrees with the center axis 1GC of the outer surface 1G of the eccentric retainer 1; and (3) the center axis 1NC of the inner surface 1N of the eccentric retainer 1 agrees with the center axis 23GC of the outer surface 23G of the bushing 23.

The retainer positioning to meet these requirements almost cancels eccentricity between the punch 25 and bushing 23, thus almost no eccentricity occurring between the center hole and a data-recorded zone of an optical disk produced through injection molding with the arrangements of the eccentric retainer 1 and the bushing 23 in the fixed-side metal mold, disclosed above.

Attaching the stamper 20 on the fixed-side metal mold using the eccentric retainer 1 as disclosed above achieves agreement between the punch center 73 and the truck center 71C shown in FIG. 3.

Although not disclosed for brevity, the present invention is also feasible under conditions in that the stamper 20 has eccentricity whereas the punch 25 and the bushing 23 have no eccentricity with each other, which can be illustrated like FIGS. 6A and 6B.

The eccentric retainer according to the present invention will further be disclosed in detail.

One requirement for the eccentric retainer is eccentricity of 100 μm or less but 5 μm or more, the distance between the center axis of the inner surface and that of the outer surface of the retainer.

This requirement comes from the following facts:

Eccentric retainers exhibiting eccentricity over 100 μm cannot be installed in an injection mold assembled with high-precision parts.

Eccentric retainers exhibiting the eccentricity less than 5 μm cause larger eccentricity which varies over mass-produced disks due to the causes (2) and (3) of disk eccentricity discussed already in which eccentricity of less than 5 μm is a possible eccentric range for causing change in eccentricity on disks one by one. Thus, eccentric retainers exhibiting the eccentricity less than 5 μm are of no use.

Under consideration of the above requirement, three types of eccentric-retainer exhibiting eccentricity of 20 μm, 40 μm and 60 μm with a 20-μm gap, can provide optical disks exhibiting eccentricity of 20 μm or less against the total eccentricity of 80 μm or less on the injection molding machine due to the causes (1) to (4).

Moreover, other three types of eccentric retainer exhibiting eccentricity of 10 μm, 20 μm and 30 μm with a 10 μm gap, provide optical disks exhibiting eccentricity of 10 μm or less compared to known retainers that cause the maximum eccentricity of 40 μm for optical disks.

One problem with the eccentric retainers exhibiting eccentricity of, for example, 10 μm or less (between the center axis of the inner surface and that of the outer surface of the retainer) is that visual inspection is almost impossible as to which direction and at what amount the eccentric retainers have eccentricity.

To avoid such a problem, the eccentric retainer according to the invention is provided, for example, with the markers 2 indicating the amount of eccentricity, shown in FIGS. 4A and 4B. They are formed on the upper surface 1U of the guard section 1T in the center axis 1NC's side, along the line L connecting the center axis 1GC of the outer surface 1G and the center axis 1NC of the inner surface 1N.

The makers formed on several eccentric retainers according to the invention, indicating a particular amount of eccentricity applied to each retainer allow users to select any one of them for a desired amount of eccentricity and to know the direction of attaching the retainer. The markers are symbols, graphic symbols, arrows, numerals, characters, etc., to distinguish the eccentric retainers from one another on the amount of eccentricity.

The markers are transferred onto optical disks produced using the eccentric retainers.

The stamper 10 is also formed the marker 13 indicating a particular amount of eccentricity applied to this stamper, as shown in FIGS. 5A and 5B. The marker 13 is formed in the center axis 1NC's side but on the location of no data-recorded zone being formed, along the line La connecting the center axis 11NC of the inner-most section (track) 11N and the center axis 12C of the center hole 12.

Stamper markers are also symbols, graphic symbols, allows, numerals, characters, etc., to distinguish stampers from one another on the amount of eccentricity.

Instead of the marker 13, the eccentricity of each stamper may be listed on a stamper-eccentricity inspection list as an angle based on the position of serial numbers or symbols labeled on the stamper.

The location of serial numbers or symbols labeled on the stamper may be different from the location of the markers 2 indicating the direction of eccentricity applied to the eccentric retainer.

These markers formed on the stamper and also the eccentric retainer, indicating the amount and direction of eccentricity, allows users to check whether the stamper is attached on a fixed-side metal mold in a correct direction.

Moreover, the markers formed on the eccentric retainers are transferred onto optical disks when molded. The transferred markers help users know that the optical disks are the ones with special less-eccentricity treatments disclosed above.

Figure 7:
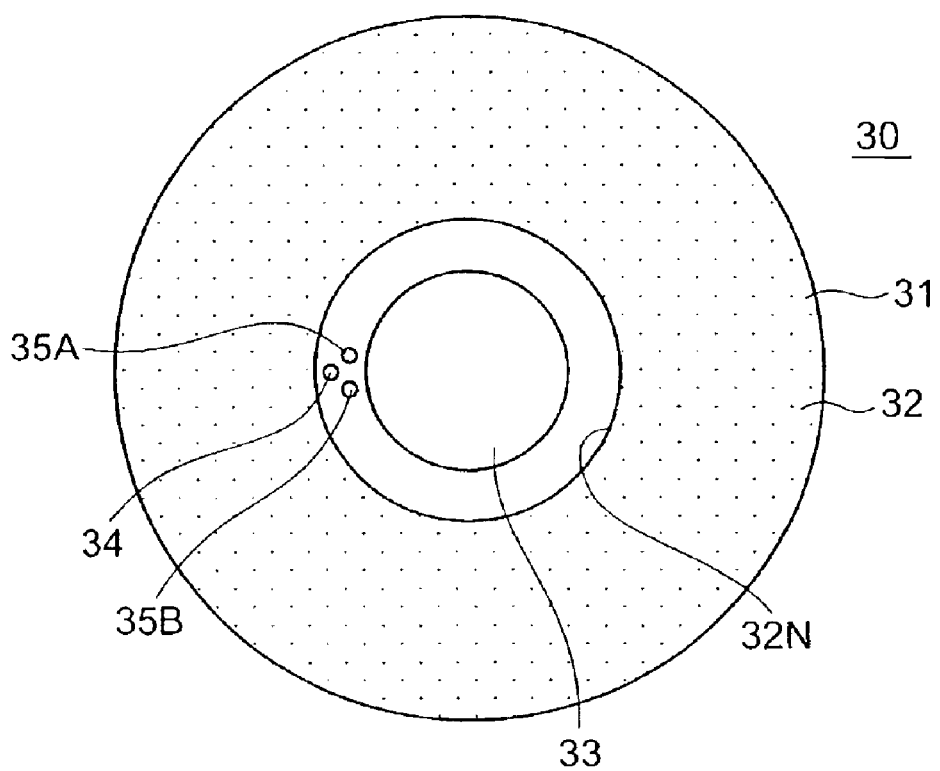
FIG. 7 is a plan view showing an embodiment of disk according to the present invention.

FIG. 7 shows a plan view of an embodiment of disk according to the present invention.

An optical disk 30, an embodiment according to the present invention, has a transparent substrate 31 formed on which are a data-recorded zone 32, a reflective layer and a protective layer (both not shown) in order.

This optical disk 30 was produced with the help of the eccentric retainer according to the present invention, thus the center of a center hole 33 agreeing with that of the innermost section (track) of the data-recorded zone 32.

Formed on the zone except the data-recorded zone 32 on the transparent substrate 31 are markers 34, 35A and 35B. The marker 34 and the markers 35A and 35B were transferred from the stamper and the eccentric retainer, respectively, of the invention, disclosed above, when the optical disk 30 was molded.

The markers for the eccentric retainer is formed of a symbol "○" or "Δ" depending on whether an optical disk is produced with the help of the eccentric retainer exhibiting eccentricity in unit of 10 μm or 20 μm.

In detail, a symbol "○" is used for the marker when an optical disk is produced with the help of the eccentric retainer exhibiting eccentricity of 10 μm whereas a symbol "○○" is used when an optical disk is produced with the eccentric retainer exhibiting eccentricity of 20 μm.

Moreover, a symbol "Δ" is used for the marker when an optical disk is produced with the help of the eccentric retainer exhibiting eccentricity of 20 μm whereas a symbol "ΔΔ" is used when an optical disk is produced with the eccentric retainer exhibiting eccentricity of 40 μm.

Similar symbol arrangements but different from those for the eccentric retainer are applied to the marker depending on the amount of eccentricity applied to the stamper.

In addition, a note such as "SYMBOLS "○" AND "Δ" INDICATE DISK ECCENTRICITY OF 10 μm AND 20 μm, RESPECTIVELY, CANCELED" may be indicated in instruction manuals attached to the optical disks when shipped.

The note helps users know the degree of eccentricity applied to the optical disks and disk qualities.

The maker formed on the eccentric retainers disclosed above avoids mis-selection of eccentric retainers for suppressing eccentricity in molding optical disks.

Disclosed next is an effective procedure in use of the eccentric retainer according to the present invention.

(STEP 1)

The first step, after a center hole is punched through a stamper, is to inspect eccentricity between the center of the center hole and that of tracks such as spiral data grooves formed on the stamper (the amount of stamper eccentricity) and the direction of eccentricity.

A maker indicating the amount of stamper eccentricity is formed on the inner surface of the stamper in the direction of eccentricity. It may be formed at an angle of maximum or minimum eccentricity.

The marker is formed at a location where it is not covered by the guard section of the eccentric retainer of the present invention when the stamper is attached on a fixed-side metal mold.

(STEP 2)

The second step is to prepare an eccentric retainer of the present invention exhibiting eccentricity lager than the amount of eccentricity labeled on the stamper or written in as tamper inspection list.

(STEP 3)

The third step is to insert the eccentric retainer into the stamper center hole with marker positionings so that the maker formed on the guard section of the eccentric retainer meets the stamper marker location.

This marker positioning is a procedure in use of the stamper having the marker formed in the direction of maximum eccentricity whereas the eccentric retainer having the marker formed in the direction of minimum eccentricity.

The positioning procedure achieves the minimum eccentricity between the inner surface (inner hole) of the eccentric retainer and data-recorded zone (tracks) formed on the stamper.

(STEP 4)

The fourth step is to attach the stamper on a fixed-side metal mold of an injection molding machine so that the eccentric retainer is inserted along a bushing fixed in the fixed-side metal, for molding an optical-disk substrate.

The distance (amount of disk-substrate eccentricity) between the center of the center hole of the molded substrate and that of a data-recorded zone (tracks) and the direction of maximum eccentricity are inspected and recorded.

The inspected amount of disk-substrate eccentricity indicates a deviation of the punching center at the center of a movable-side metal mold, for punching a center hole through the optical-disk substrate in molding from the center of the bushing for attaching the stamper in the fixed-side metal mold.

(STEP 5)

The fifth step is to pick up the stamper with the eccentric retainer from the fixed-side metal mold and adjust the angle of the stamper in relation to the eccentric retainer (by turning the stamper around the eccentric retainer) in accordance with the amount and direction of eccentricity of the molded substrate, to have the minimum amount of eccentricity for the optical-disk substrate.

The adjusted stamper having the eccentric retainer inserted therein is again attached on the fixed-side metal mold.

Provided as eccentric retainers are three types exhibiting eccentricity of 20 μm, 40 μm and 60 μm, with a 20-μm gap, and also other three types exhibiting eccentricity of 10 μm, 20 μm and 30 μm, with a 10-μm gap.

The eccentric retainer inserted into the stamper may be replaced with another that exhibits larger eccentricity than those types if the amount of eccentricity of the molded substrate exceeds the eccentricity specifications of those types.

Accordingly, several types of eccentric retainer exhibiting different amounts of eccentricity may be provided for minimizing the amount of eccentricity of disk substrates.

(STEP 6)

Another optical-disk substrate is then molded by the injection molding machine having the fixed-side metal mold with the stamper adjusted as disclosed in STEP 5.

The distance (amount of disk-substrate eccentricity) between the center of the center hole of the molded substrate and that of a data-recorded zone (tracks) and the direction of maximum eccentricity are inspected and recorded again.

Disk mass production starts if the inspected eccentricity meets the requirements. If not, however, the procedures in STEPS 5 and 6 are repeated.

One sequence of procedures from STEPS 5 and 6 offers constant amount of eccentricity. This is because fixed-side and movable-side metal molds are rarely detached from an injection molding machine or replaced with new ones per stamper replacement once they are attached on the machine.

Nevertheless, the following STEP 3' (instead of STEP 3) for canceling eccentricity due to imprecise settings of fixed-side and movable-side metal molds provides optical-disk substrates with less eccentricity when the stamper is replaced with a new one.

(STEP 3')

An eccentric retainer is inserted into a stamper center hole with marker positionings so that the maker formed on the guard section of the eccentric retainer is distant from the stamper marker location at a predetermined angle.

This predetermined angle is an angle between the directions of eccentricity applied to the stamper and the eccentric retainer measured beforehand through STEPS 1 to 6, for canceling eccentricity due to imprecise settings of fixed-side and movable-side metal molds.

Several types of eccentric retainers exhibiting different amounts of eccentricity provide optical-disk substrates that exhibit eccentricity smaller than those of the eccentric retainers.

Moreover, an eccentric retainer exhibiting eccentricity smaller than that of a stamper can offer optical-disk substrates that exhibit very little eccentricity (for example, almost 0 μm), if installed in a metal mold in a specific direction.

Requirements for achieving such little eccentricity are as follows:

The eccentric retainer is inserted into the stamper in a specific direction so that their eccentricities cancel each other. And A punch and a die are attached in metal molds with in a specific manner so that their eccentricities cancel each other.

The procedure of eccentric-retainer installation disclosed above is just an example in this invention. In other words, the fundamental requirement of eccentric-retainer installation is to select an eccentric retainer that achieves the minimum eccentricity between the center of a punched hole (the center of a center hole of an optical-disk substrate) and the center of data-recorded zone (tracks) formed on the optical-disk substrate.

The present invention allows end users (customers) visual inspection of the amount of eccentricity applied to optical disks produced under this invention. In other words, the marker formed on each optical disk indicates that the amount of eccentricity applied to this disk is less than the marker-indicated amount.

As disclosed in detail, the disk production apparatus according to the present invention has a movable-side metal mold and a fixed-side metal mold provided as facing the movable-side metal mold. Inserted into the center hole of the fixed-side or movable-side metal mold is a retainer to attach as tamper on the fixed-side or movable-side metal mold. The center of an inner diameter of the retainer and the center of an outer diameter of the retainer are eccentric with each other.

The present invention achieves minimization of eccentricity between the center of a data-recorded zone and that of a center hole of disks produced by the disk production apparatus thanks to the retainer adjusted as having the center of its inner diameter and the center of its outer diameter eccentric with each other.

The minimization of eccentricity for disks is achieved irrespective of eccentricity between the center of spiral groove or pit train formed on the stamper and the stamper center hole or difference in diameter of stampers if small.

Moreover, the disk according to the present invention has a substrate having a center hole; a first zone formed on the substrate, data being recorded on the first zone; and a second zone formed on the substrate but outside the first zone. Labeled on the second zone is a marker indicating an amount of eccentricity applied to a retainer, adjusted as discussed above, used in production of the disk by injection molding.

The present invention allows end users to know, with the marker, that this disk is a high-quality disk for which eccentricity has been minimized.

Furthermore, the retainer used in production of disks by injection molding according to the invention includes a cylindrical outer surface, a cylindrical inner surface parallel to the outer surface and a guard section provided on the inner and outer surfaces. The guard section has a clamping surface for pressing a stamper under the guard section when the stamper is attached in a metal mold for injection molding. The center of a diameter of the inner surface and that of a diameter of the outer surface are eccentric with each other.

The present invention achieves minimization of eccentricity between the center of a data-recorded zone and that of a center hole of disks produced using the retainer.

What is claimed is:

1. A disk production apparatus comprising:
   a movable-side metal mold;
   a fixed-side metal mold provided as facing the movable-side metal mold, the fixed-side metal mold having a center hole; and
   a retainer inserted into the center hole to attach a stamper on the fixed-side metal mold, a first center of an inner diameter of the retainer and a second center of an outer diameter of the retainer being eccentric with each other,
   wherein the retainer has a marker indicating an amount of eccentricity between the first and the second centers, the marker being to be transferred onto a disk.

2. The disk production apparatus according to claim 1 wherein the marker is formed along a straight line connecting the first and the second centers.

3. A disk production apparatus comprising:
   a fixed-side metal mold;
   a movable-side metal mold provided as facing the fixed-side metal mold, the movable-side metal mold having a center hole; and
   a retainer inserted into the center hole to attach a stamper on the movable-side metal mold, a first center of an inner diameter of the retainer and a second center of an outer diameter of the retainer being eccentric with each other,
   wherein the retainer has a marker indicating an amount of eccentricity between the first and the second centers, the marker being to be transferred onto a disk.

4. The disk production apparatus according to claim 3 wherein the marker is formed along a straight line connecting the first and the second centers.

5. A disk production apparatus comprising:
   a movable-side metal mold;
   a fixed-side metal mold provided as facing the movable-side metal mold, the fixed-side metal mold having a first center hole; and a retainer inserted into the first center hole to attach a stamper on the fixed-side metal mold, a first center of an inner diameter of the retainer and a second center of an outer diameter of the retainer being eccentric with each other, wherein the retainer has a first marker indicating an amount of eccentricity between the first and the second centers, the first marker being transferred onto a disk; and the stamper has a data-recorded zone formed thereon and a second center hole through which the stamper is held on the fixed-side metal mold, a first center axis of an inner-most section of the data-recorded zone and a second center axis of the second center hole being eccentric with each other, the stamper having a second marker indicating an amount of eccentricity between the first and the second centers axes, the second marker being to be transferred onto the disk.

6. The disk production apparatus according to claim 5 wherein the first marker is formed along a straight line connecting the first and the second centers whereas the second marker is formed on a zone on the stamper and along a straight line connecting the first and the second center axes, the zone being different from the data-recorded zone.

7. A disk production apparatus comprising:

a fixed-side metal mold;

a movable-side metal mold provided as facing the fixed-side metal mold, the movable-side metal mold having a first center hole; and a retainer inserted into the first center hole to attach a stamper on the movable-side metal mold, a first center of an inner diameter of the retainer and a second center of an outer diameter of the retainer being eccentric with each other, wherein the retainer has a first marker indicating an amount of eccentricity between the first and the second centers, the first marker being to be transferred onto a disk; and the stamper has a data-recorded zone formed thereon and a second center hold through which the stamper is held on the fixed-side metal mold, a first center axis of an inner-most section of the data-recorded zone and a second center axis of the second center hold being eccentric with each other, the stamper having a second marker indicating an amount of eccentricity between the first and the second centers axes, the second marker being to be transferred onto the disk.

8. The disk production apparatus according to claim 7 wherein the first marker is formed along a straight line connecting the first and the second centers whereas the second marker is formed on a zone on the stamper and along a straight line connecting the first and the second center axes, the zone being different from the data-recorded zone.

* * * * *